US 7,886,347 B2

(12) United States Patent
Gill et al.

(10) Patent No.: US 7,886,347 B2
(45) Date of Patent: Feb. 8, 2011

(54) FORENSIC TOOLKIT AND METHOD FOR ACCESSING DATA STORED ON ELECTRONIC SMART CARDS

(75) Inventors: Andrew James Gill, Sway (GB); Neil James Maitland, Winchester (GB)

(73) Assignee: Radio Tactics Limited, Southampton, Hampshire (GB)

( * ) Notice: Subject to any disclaimer, the term of this patent is extended or adjusted under 35 U.S.C. 154(b) by 1316 days.

(21) Appl. No.: 11/403,408

(22) Filed: Apr. 12, 2006

(65) Prior Publication Data
US 2006/0234772 A1 Oct. 19, 2006

(30) Foreign Application Priority Data
Apr. 14, 2005 (GB) ................. 0507495.0

(51) Int. Cl.
G06F 7/04 (2006.01)
(52) U.S. Cl. ............ 726/9; 455/558; 713/169; 713/193; 713/194
(58) Field of Classification Search .......... 455/410, 455/411, 558; 726/9, 713; 713/193, 194
See application file for complete search history.

(56) References Cited

U.S. PATENT DOCUMENTS

| | | | |
|---|---|---|---|
| 2004/0176032 A1* | 9/2004 | Kotola et al. ............ | 455/41.2 |
| 2004/0204089 A1* | 10/2004 | Castrogiovanni et al. .... | 455/558 |
| 2004/0206822 A1* | 10/2004 | Crandall ............ | 235/462.13 |
| 2004/0215964 A1* | 10/2004 | Barlow et al. ............ | 713/172 |
| 2004/0235523 A1* | 11/2004 | Schrire et al. ............ | 455/558 |
| 2005/0096087 A1* | 5/2005 | Kim ............ | 455/558 |
| 2005/0149758 A1* | 7/2005 | Park ............ | 713/201 |
| 2006/0135207 A1* | 6/2006 | Kahlman et al. ............ | 455/558 |
| 2006/0205386 A1* | 9/2006 | Yu et al. ............ | 455/411 |
| 2007/0192602 A1* | 8/2007 | Blom et al. ............ | 713/169 |

FOREIGN PATENT DOCUMENTS

| | | |
|---|---|---|
| EP | 0829831 A | 3/1998 |
| EP | 0962875 A | 12/1999 |
| EP | 1288840 A | 3/2003 |
| EP | 1365621 A | 11/2003 |
| FR | 2681165 A | 3/1993 |
| FR | 2729523 A | 7/1996 |

(Continued)

OTHER PUBLICATIONS

ISO copyright office, International standard IOS/IEC 7816-11 first edition Apr. 1, 2004, 40 pages.*

(Continued)

*Primary Examiner*—Taghi T Arani
*Assistant Examiner*—Jason Lee
(74) *Attorney, Agent, or Firm*—Klarquist Sparkman, LLP

(57) ABSTRACT

A tool kit for accessing data stored on an electronic SMART card is provided, the kit comprising a SMART card reader and recorder, at least one storage card, and a control card. The card reader and recorder is operative to read and copy the electronic SMART card onto the storage card, and to read the control card, the storage card comprising a storage card security key. The control card comprises code generation means operative to generate a control card security key, copying of the electronic SMART card onto the storage card being prevented unless the control card security key is verified against the storage card security key.

17 Claims, 6 Drawing Sheets

FOREIGN PATENT DOCUMENTS

FR          2857135 A       1/2005

OTHER PUBLICATIONS

European Patent Office, European Search Report for European Application No. EP06251938.4-2221, Oct. 5, 2006, 13 pages.
European Patent Office, European Search Report for European Application No. EP06251938.4-2221, Jan. 19, 2009, 5 pages.
"Forensicsimtoolkit," Radio Tactics Limited, published Mar. 8, 2005, 2 pages.
"Digital Forensics—Learning to Deal with The Evidence," Evidence Talks Newsletter, published Sep. 2004, 4 pages.
European Patent Office, European Search Report for European Application No. EP09002507, May 19, 2009, 2 pages.
"Universal Mobile Telecommunications System (UMTS); 3G Security; Security Architecture (3GPP TS 33.102 version 6.3.0 Release 6)," ETSI TS 133 102, V6.3.0, Dec. 2004.
"Cloning SIM Cards," Mobile Telephone Evidence, Trew & Co., Special Issue: B/2002, 13 pages (retrieved from Internet May 4, 2009).

* cited by examiner

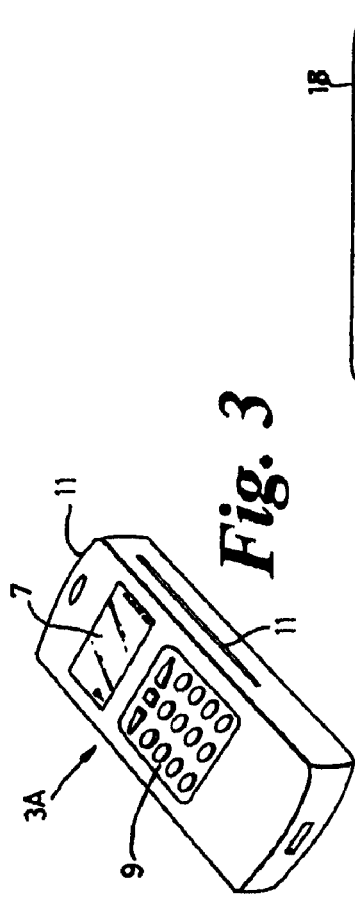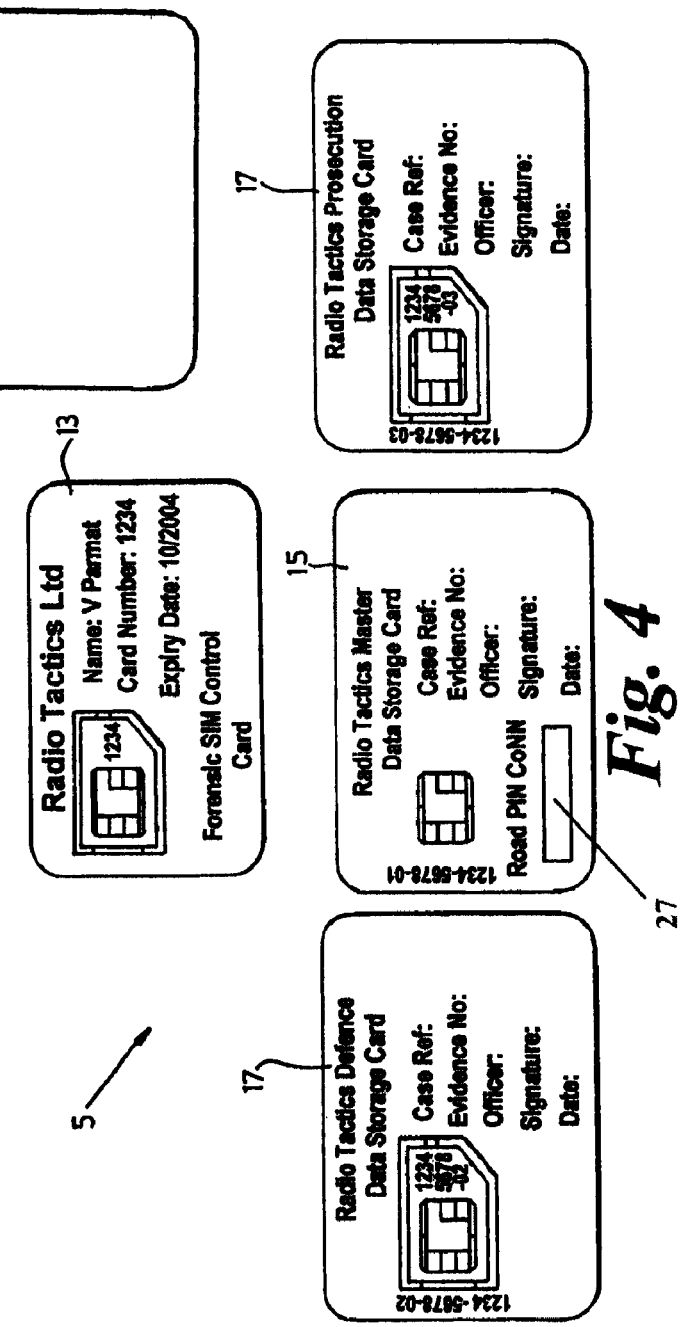

US 7,886,347 B2

FORENSIC TOOLKIT AND METHOD FOR ACCESSING DATA STORED ON ELECTRONIC SMART CARDS

CROSS-REFERENCE TO RELATED APPLICATION

The present application claims priority to Great Britain Application No. GB 0507495.0, filed Apr. 14, 2005, which is incorporated herein by reference.

FIELD

The present disclosure relates to a forensic toolkit and method for accessing data stored on electronic SMART cards and particularly, but not exclusively, for accessing data stored on mobile phone SIM or USIM cards.

BACKGROUND

Electronic SMART cards are widely used in a range of scenarios including, for example, in mobile phones, and on commercial vehicles to verify driver information and vehicle usage information such as maximum speed for example.

Police Forces regularly come into contact with electronic SMART cards as part of their day-to-day police work. For example, mobile phone usage has reached a relatively high level in many countries with a relatively high number of adult citizens carrying and using a mobile phone handset on a regular basis. The Police have progressively realised the value and significance of the evidential data potentially held within the electronics of SMART cards.

As with all information gathered by the Police, the quality and integrity of the data must be absolute and to this end the term 'forensic evidence' is commonly used to describe any information or data that has been obtained and interpreted by the Police for the purposes of establishing evidence.

To ensure that any data gathered by the Police can be regarded as forensic evidence, there is an ongoing requirement for tools and equipment that can be used to acquire information in a reliable, non-invasive and non-destructive way, and where the potential for data modification whether intentional or otherwise is kept to a minimum.

SUMMARY

According to a first aspect of the disclosure there is provided a tool kit for accessing data stored on an electronic SMART card, the kit comprising a SMART card reader and recorder, at least one storage card, and a control card, the card reader and recorder being operative to read and copy the electronic SMART card onto the storage card, and to read the control card, the storage card comprising a storage card security key, the control card comprising code generation means operative to generate a control card security key, copying of the electronic SMART card onto the storage card being prevented unless the control card security key is verified against the storage card security key.

The security key, could comprise any electronic code, signal or identifier, whether encrypted or otherwise.

Preferably the control card generates the control card security key using data relating to the storage card.

Preferably the control card comprises database means containing data relating to a plurality of storage cards, the data including data enabling the control card to distinguish between storage cards.

Preferably the database means contains data relating to a plurality of production batches of storage cards, the data including data enabling the control card to distinguish between batches.

Preferably the database means further comprises a plurality of storage card access security keys, each storage card access security key being particular to a particular batch of storage cards, data exchange between the control card and the storage card being prevented, in use, until an access security key input to the control card by a user has been verified.

Preferably the database means includes data comprising a plurality of randomly generated encryption keys, one of the encryption keys being used by the control card as part of the verification process between the control card and the storage card.

Preferably the code generation means is operative to generate the control card security key for verification against a particular storage card using an encryption key particular to that storage card.

Preferably the particular encryption key used is selected by the control card using a random integer relating to the particular encryption key, the random integer being stored on the storage card.

Preferably the storage card also stores an encrypted security key. Preferably the encrypted security key is pre calculated on manufacture of the storage card by inputting the random integer and the storage card security key into an encryption algorithm.

Preferably the code generation means is operative to generate the control card security key by decrypting the encrypted security key using the particular encryption key.

Preferably the code generation means comprises a decryptor. Most preferably the decryptor comprises a cryptographic processor.

Typically, where the electronic SMART cared comprises a mobile phone SIM or USIM card a particular access control class specific to the user of the SIM or USIM card and indicative of the priority of that particular user on the mobile phone network concerned is allocated to the SIM or USIM card. To access the mobile phone network the mobile phone SIM or USIM card, in use, checks that the user's access control class is enabled.

Preferably the tool kit comprises more than one storage card, one of the storage cards comprising an access storage card for use with a mobile phone handset, the card reader and recorder being operative to alter the copy of the mobile phone SIM or USIM card made on the access storage card so that the copy is not allocated any access control classes, the arrangement being such that, when the copy of the mobile phone SIM or USIM card is activated in a mobile phone handset, the copy of the mobile phone SIM or USIM card is not allowed access to any of the mobile phone networks.

Preferably the card reader and recorder is operative to alter the copy of the mobile phone SIM or USIM card such that when the copy of the mobile phone SIM or USIM card is activated in a mobile phone handset, the authentication procedure that normally occurs between a mobile phone SIM or USIM card and a mobile phone network is disrupted.

Preferably, where the mobile phone network ordinarily authenticates the mobile phone SIM or USIM card by requesting a secret integer and verifying the requested secret integer against a prestored expected integer, the card reader and recorder prevents the secret integer being supported on the storage card.

Preferably the or each storage card is operative to prevent verification of the correct control card security key more than once and thus is operative to prevent writing of files to the storage card more than once.

Preferably the storage card comprises stored batch data, namely data indicative of the date the storage card was manufactured.

Preferably the file structure of the copy of the SMART card on each storage card comprises a different logical layout to the file structure of the target SMART card.

Preferably the card reader and recorder comprises slot means to receive at least two electronic SMART cards, and control means operative to control the operation of the SMART cards and to control the access of data from, and the communication between, the two SMART cards.

Preferably the card reader and recorder is a desktop terminal. Alternatively the card reader and recorder is a hand held terminal.

According to a second aspect of the disclosure there is provided a control card for use in copying an electronic SMART card onto storage means, the control card comprising code generation means operative to generate a control card security key, and means to prevent copying of the SMART card onto the storage means unless the control card security key is verified against a predetermined storage means security key.

Preferably the control card is for use with storage means comprising a storage card, the control card, in use, generating the control card security key using data relating to the storage card.

Preferably the control card comprises database means containing data relating to a plurality of storage cards, the data including data enabling the control card to distinguish between storage cards.

Preferably the database means contains data relating to a plurality of production batches of storage cards, the data including data enabling the control card to distinguish between batches.

Preferably the database means further comprises a plurality of storage card access security keys, each storage card access security key being particular to a particular batch of storage cards, data exchange between the control card and the storage card being prevented, in use, until an access security key input to the control card by a user has been verified.

Preferably the database means includes data comprising a plurality of randomly generated encryption keys, one of the encryption keys being used by the control card as part of the verification process between the control card and the storage card.

Preferably the control card comprises code generation means operative to generate the control card security key for verification against a particular storage card using an encryption key particular to that storage card.

Preferably the particular encryption key used is selected, in use, by the control card using a random integer relating to the particular encryption key, the random integer being stored on the storage card.

Preferably the code generation means is operative to generate the control card security key by decrypting an encrypted security key on the storage card using the particular encryption key selected.

Preferably the encrypted security key is derived from entering the random integer and the storage card security key into an encryption algorithm.

Preferably the code generation means comprises a decryptor. Most preferably the decryptor comprises a cryptographic processor.

According to a third aspect of the disclosure there is provided an access storage card comprising means to store a copy of a mobile phone SIM or USIM card on the access storage card to enable the access storage card to communicate with a mobile phone handset such that mobile phone data stored on the copy of the mobile phone SIM or USIM card and stored on the mobile phone handset can be accessed, data transfer between one or both of the storage card and the mobile handset, and any mobile phone network, in use, being prevented.

Typically a mobile phone SIM or USIM card is allocated a particular access control class specific to the user of the SIM or USIM card and indicative of the priority of that particular user on the mobile phone network concerned. To access the mobile phone network the mobile phone SIM or USIM card checks that the user's access control class is enabled.

Preferably the access storage card comprises an altered copy of the mobile phone SIM or USIM card, the copy being altered so as not to be allocated any access control classes, the access storage card being such that, when the copy of the mobile phone SIM or USIM card is activated in a mobile phone handset, one or both of the copy of the mobile phone SIM or USIM card and the mobile phone handset is prevented from accessing any of the mobile phone networks.

Preferably the copy is altered such that the authentication procedure that normally occurs between a mobile phone SIM or USIM card and a mobile phone network is disrupted.

Preferably, where the mobile phone network authenticates the mobile phone SIM or USIM card by requesting a secret integer and verifying the requested secret integer against a prestored expected integer, the copy of the mobile phone SIM or USIM card is altered such that the secret integer is prevented from being supported on the access storage card.

Preferably the access storage card comprises means to prevent writing of files to the storage card without a correct security key being verified against an access storage card security key.

Preferably the access storage card is operative to prevent acceptance of the correct security key more than once and thus prevents writing of files to the storage card more than once.

Preferably the access storage card comprises prestored data indicative of the date the storage card was manufactured.

Preferably the access storage card comprises a prestored random index integer specific to the access storage card, the access storage card further comprising a prestored encrypted security key derived from entering the random index integer and the storage card security key into an encryption algorithm.

According to a fourth aspect of the discosure there is provided a plurality of cards for accessing data stored on a electronic SMART card, the plurality of cards comprising at least two storage cards for each storing a respective copy of the electronic SMART card such that each storage card can, in use, communicate with an electronic device to enable data to be accessed, each storage card comprising a respective storage card security key, the kit further comprising a control card comprising code generation means operative to generate a control card security key, each storage card being operative to prevent, in use, copying of the electronic SMART card onto each storage card unless the control card security key is verified against the respective storage card security key.

According to a fifth aspect of the disclosure there is provided a method of copying a mobile phone SIM or USIM card onto a storage card, the method comprising a step of altering the copy of the mobile phone SIM or USIM card such that, in use of the storage card with a mobile phone handset, data transfer between at least one of the copy of the mobile phone SIM or USIM card and the mobile phone handset, and any mobile phone network, is prevented.

Preferably the method comprises a step of altering the copy of the mobile phone SIM or USIM card made on the storage card so as not to allocate any access control classes to the copy, such that, when the copy of the mobile phone SIM or USIM card is used in a mobile phone handset, the copy of the mobile phone SIM or USIM is prevented from accessing any of the mobile phone networks.

Preferably the method comprises a step of altering the copy of the mobile phone SIM or USIM card such that when the copy of the mobile phone SIM or USIM card is used in a mobile phone handset, the authentication procedure that normally occurs between a mobile phone SIM or USIM card and a mobile phone network is disrupted.

Preferably the method comprises a step, where the mobile phone network authenticates the mobile phone SIM or USIM card by requesting a secret integer and verifying the requested secret integer against a prestored expected integer, of preventing the secret integer being supported on the storage card.

Preferably the method comprises a step of creating means on the storage card to prevent writing of files to the storage card more than once.

According to a sixth aspect of the disclosure there is provided an electronic data processor operative according to the method of the fifth aspect of the invention.

According to a seventh aspect of the disclosure there is provided a method of copying an electronic SMART card using a SMART card reader and recorder, at least one storage card, and a control card, the method comprising steps of using the card reader to read a storage card security key from the storage card, using the control card to generate a control card security key, verifying the control card security key against the storage card security key, the method comprising a further step of preventing copying of the electronic SMART card onto the storage card unless the control card security key is successfully verified against the storage card security key.

The security key could comprise any electronic code, signal or identifier, whether encrypted or otherwise.

Preferably the method comprises a step of generating the control card security key using data relating to the storage card.

Preferably the method comprises a step of generating the control card security key using date from database means containing data relating to a plurality of storage cards, the data including data enabling the control card to distinguish between storage cards.

Preferably the method uses data from database means containing data relating to a plurality of production batches of storage cards, the data including data enabling the control card to distinguish between batches.

Preferably the method uses data from database means further comprising a plurality of storage card access security keys, each storage card access security key being particular to a particular batch of storage cards, the method comprising a step of preventing data exchange between the control card and the storage card until an access security key input to the control card by a user has been verified against a stored storage card access security key.

Preferably the method uses data from database means comprising a plurality of randomly generated encryption keys, the method comprising a step of controlling the control card to use one of the encryption keys as part of the verification process between the control card and the storage card.

Preferably the step of controlling the control card comprises generating the control card security key for verification against a particular storage card using an encryption key particular to that storage card.

Preferably the particular encryption key used is selected by the control card using a random integer relating to the particular encryption key, the random integer being stored on the storage card.

Preferably the storage card also stores an encrypted security key.

Preferably the method comprises a step of pre-calculating the encrypted security key on manufacture of the storage card by inputting the random integer and the storage card security key into an encryption algorithm.

Preferably the method step of generating the control card security key comprises a step of decrypting the encrypted security key using the particular encryption key.

Preferably the method comprises a step of reading, from the control card, data indicative of the batch date of that storage card to select database means particular to the batch date of the storage card concerned.

Preferably the method comprises a subsequent step of determining an access security key from the particular database means selected, and a subsequent step of verifying the access security key against an access security key stored in the storage card, and a further step of preventing use of the storage card if the access security key are unsuccessfully verified.

According to an eighth aspect of the invention there is provided an electronic data processor operative according to the method of the seventh aspect of the invention.

Other aspects of the present invention may include any combination of the features or limitations referred to herein.

BRIEF DESCRIPTION OF THE DRAWINGS

The present invention may be carried into practice in various ways, but embodiments will now be described by way of example only with reference to the accompanying drawings in which:

FIG. 3 is a perspective view of a hand held terminal comprising part of the toolkit of FIG. 1;

FIG. 4 is a plan view of a plurality of cards comprising part of the toolkit of FIG. 1;

DETAILED DESCRIPTION

Figure 1:
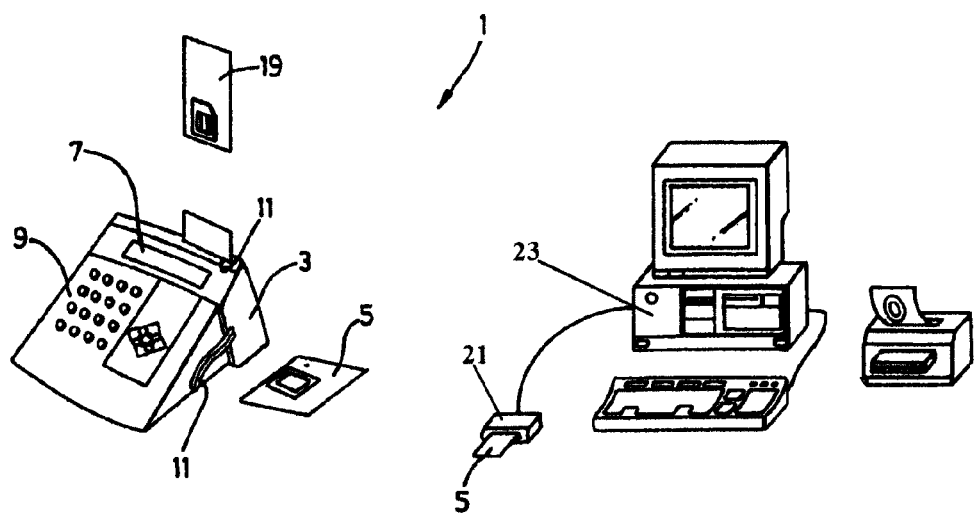
FIG. 1 is a schematic view of a forensic toolkit in accordance with the present invention.

Referring initially to FIGS. 1 to 4, a forensic toolkit 1 comprises a data acquisition terminal 3 which functions as an electronic SMART card reader and recorder, and a plurality of electronic SMART cards 5 on each of which is provided stored data and code used by the terminal 3. Such electrical SMART cards 5 could be in accordance with ISO specification 7816.

The acquisition terminal 3 is a standalone desktop unit comprising an embedded electronic data processor with visual display 7, keyboard 9 and four SMART card slots 11. It runs a specifically written program which leads a technician through each acquisition step, ensuring that the correct process is followed. It also implements a number of security features.

Figure 2:
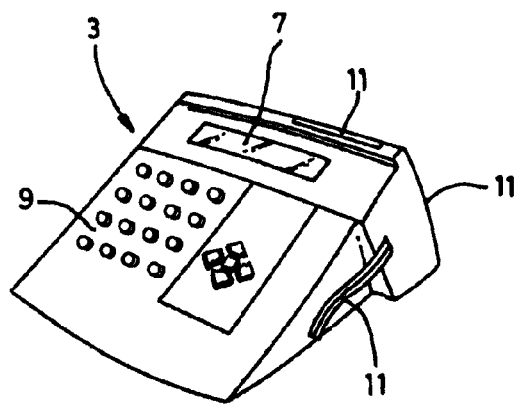
FIG. 2 is a perspective view of a desktop terminal comprising part of the toolkit of FIG. 1.

The terminal 3 does not provide any means for the data on any of the SMART cards 5 used with the terminal 3 to be viewed and is solely used for generating copies of a target SMART card data onto the other SMART cards 5. The terminal 3 can be provided in the form of the desktop terminal 3 as shown in FIGS. 1 and 2, and/or a handheld terminal 3A as shown in FIG. 3.

The set of cards 5 comprises a control SMART card 13, a master SMART storage card 15, two other storage SMART cards 17 which are intended for use by defence and prosecution counsels in court proceedings, and an access storage SMART card 18 which can be used with the device with which the target SMART card is ordinarily used. Where the target SMART card is a mobile phone SIM or USIM card, the access SMART card 18 can be used in a device comprising a mobile phone handset.

The control card 13 shown in FIG. 4 is a specially programmed JAVA SMART card which uniquely identifies each acquisition terminal operator, stores secure key information, and performs encryption operations. It must be inserted into the terminal 3 before acquisition of data from other cards 5, or writing of data from one card 5 to another, may commence.

By 'key' we mean any electronic code, signal or identifier, whether encrypted or otherwise. Such a key could comprise, for example, a simple combination of alphanumeric integers, or a more complex encrypted code.

The master card 15 and storage cards 17 are specially prepared SMART cards which are used to hold data acquired from a target card 19, the target card 19 comprising the original SMART card in question. Once the data has been written to each card 15, 17 during acquisition, the card 15, 17 are electronically 'locked' to prevent modification of the copied data at a later date.

The access storage card 18 can be used, for example where the target SMART card is a mobile phone SIM or USIM card, in a mobile phone handset but prevents the handset communicating with a mobile phone network and thus prevents data transfer between one or both of the access storage card 18 and the mobile phone handset and the mobile phone network.

The acquisition process begins with insertion of the control card 13 into the terminal 3. The target card 19 is then inserted into the terminal 3 followed by a master storage card 15 or a storage card 17, all prior to acquisition of data from the target card 19 commencing. With the storage card 15, 17 fully inserted data acquisition begins, the data comprising digital information stored on the target card 19. When the data has been successfully copied, the storage card 15, 17 is/are ejected from the terminal 3, completing the acquisition phase of the process.

The analysis of the copied data begins with the insertion of a storage card 15, 17 into a SMART card mouse 21 which is connected to standard PC 23. The PC 23 runs a data analysis program, which may be, for example, a Windows® type application, and which permits interrogation of the data contained on the storage card 15, 17 and generates reports for evidential purposes. This program provides read-only access to the data stored on the cards 15, 17 and is able to generate textual reports on the contents of the inserted card 15, 17, which may be viewed on screen, saved to a disk file or printed.

Each acquisition operation creates three separate copies of the data from the target card 19.

The first copy of the data is made on the master storage card 15. This card 15 contains a copy of the data from the target card 19 and also contains key information about the acquisition process including the operator identity provided from the control card 13. A security PIN must be entered to read the data after acquisition. This security PIN is created during manufacture of the master card 15 and is hidden behind a scratch-off panel 27 on the front of this card 15. This copy of the data from the target card 19 is designed to only be accessed as a last resort to confirm that the data on the other storage cards 17 exactly matches the data on the target card 19.

The second copy of the data is made on the defence storage card 17. This card contains a copy of the data from the target card 19 and also contains information about the acquisition process. Details of the control card 13 may be withheld from this card 17 at the discretion of the acquisition operator.

The third copy of the data is made on the prosecution storage card 17 this card 17 is identical to the defence storage card 17.

Due to the nature of the toolkit 1, the components described above have different levels of re-use. The following table provides a summary of the re-use and quantity requirements for each component:

| Component | Re-usable | Quantity required |
| --- | --- | --- |
| Acquisition Desk top Terminal 3 | Yes | As needed |
| Handheld Acquisition Terminal 3A | Yes | As needed |
| Data Analysis Program | Yes | As needed (one copy supplied with each acquisition terminal) |
| Control Card 13 | Yes, but may be time or use limited if required | One for each terminal |
| Data Storage Card pack (containing Master, Defence and Prosecution cards 15, 17) | No | One pack for each Target Card acquisition |

The toolkit 1 supports the following processes:
1. Acquisition—during this process data is read from a target SMART card 19 and recorded on storage cards 15, 17.
2. Analysis—this allows the data recorded on each storage card 15, 17 to be read, and reports generated about the data obtained from the target card 19.
3. Terminal Calibration—in order to ensure integrity of the terminal 3, the terminal 3 requires a regular calibration and integrity test.

The equipment and processes used at each stage are described in the following paragraphs.

Figure 5:
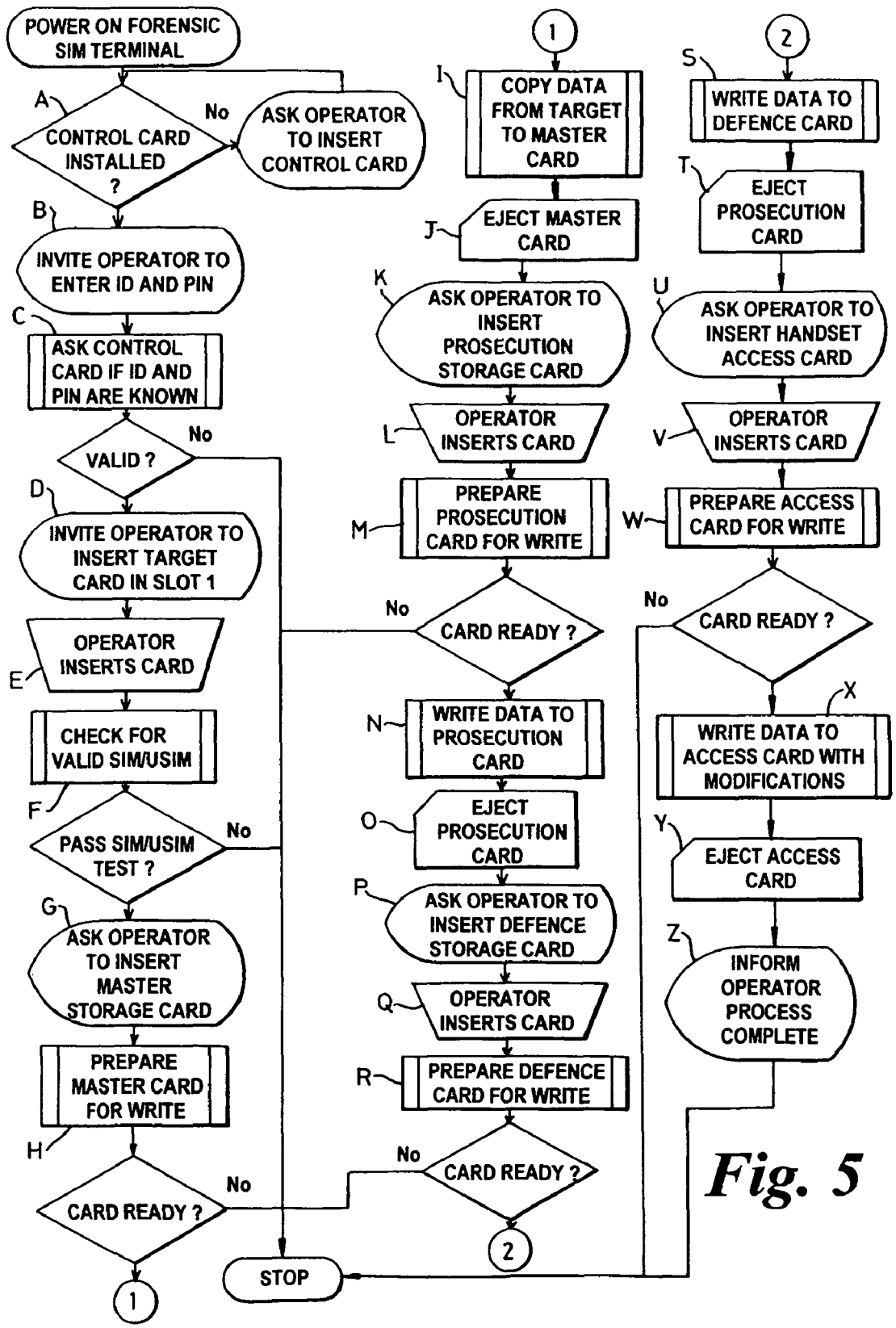
FIG. 5 is a flow diagram of a method of using the forensic toolkit of FIGS. 1 to 4.
Figure 6:
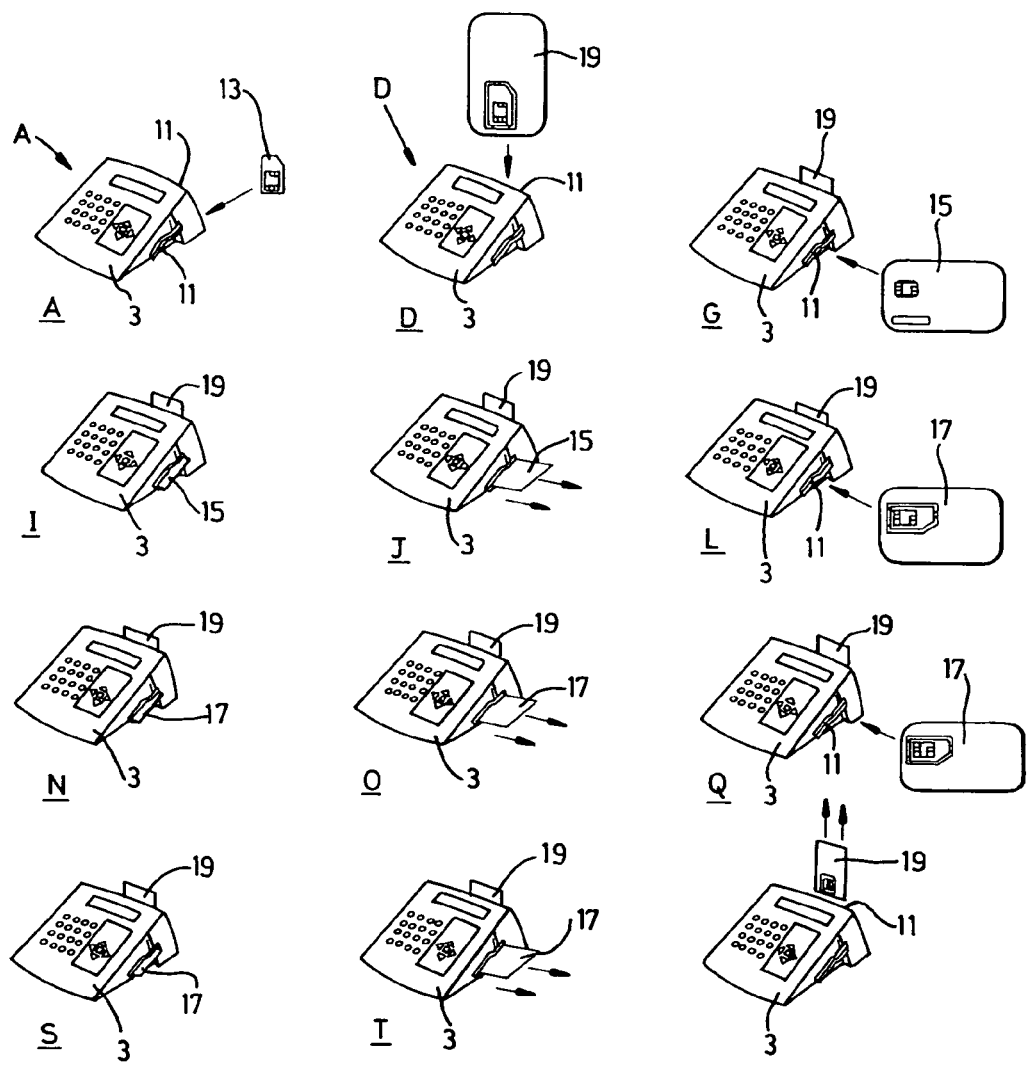
FIG. 6 is a schematic view of the method of using the forensic toolkit of FIG. 5.

The toolkit 1 is able to copy data from the target card 19 to storage cards 15, 17 while ensuring data integrity. This is achieved by following steps A-Z as shown in FIGS. 5 and 6. It can be seen that at each stage of the process the integrity of each component and its data is confirmed.

The data acquisition process begins by inserting the control card 13 into one of the card reader slots 11 in the terminal 13 which then invites the operator to enter his personal identity information and his secret access security key which may be in the form of a PIN. The PIN is verified against a PIN stored in the control card.

If verified, the user inserts the target SMART card 19 into another of the card reader slots 11 and the terminal 3 checks that the target SMART card 19 is valid.

The user then inserts the master storage card 15 into another of the card reader slots 11 and the terminal 3 prepares the master card 15 for data transfer from the target card 19. If the master card validity is verified, data is transferred.

The user then sequentially inserts the defence and prosecution storage cards 17 which are each checked by the terminal 3 for validity. If the storage card validity is verified, data is transferred.

Finally, the user inserts the access card 18 into a card reader slot 11 and the terminal 3 checks the validity of the access card 18 before copying data to the access card 18 from the target card 19. It is to be appreciated that the data copied to the access card 18 is modified to prevent the access card 18 accessing a mobile phone network when the access card 18 is later used in a mobile phone handset. This modification process is described below.

Each card 15, 17, 18 is automatically ejected by the terminal 3 upon completion of the data transfer to the respective card 15, 17, 18 from the target card 19.

The acquisition process copies the following data onto the storage cards 15, 17, 18:
1. Standard SMART files (for example GSM SIM or USIM files) as specified in Appendix A. These will be created on the Storage Cards 15, 17, 18 to be an exact replica of the files on the Target Card 19.
2. Start and end time of data writing process.
3. Checksum of file contents (a number of different checksum/fingerprinting algorithms can be used).
4. Control card 13 identification information including operator name (only written to Defence and Prosecution storage cards 17 if requested by operator during acquisition).

The SMART files are stored in a file system, and can be viewed using standard SMART tools. However, due to the security mechanism, these files may only be read, not updated, after acquisition.

The remaining information is stored in files under a new directory which is specific to the toolkit 1. These files can be read and interpreted using the analysis program described below.

The analysis of data held on storage cards 15, 17, 18 is performed by the analysis program component running on the PC 23.

The main features of the program include:
Automatic detection of storage card 15, 17, 18 insertion and removal from the terminal 3.
Automatic storage card 15, 17, 18 type detection and summary display.
Automatic prompting for an access security key if required.
Automatic loading and verification of data stored on the storage cards 15, 17, 18 and indication of errors on a file-by-file basis.
Form-style dialog page provided for entry of extra report information, such as case identification information.
One-button report generation.
Options to view report on screen, save to text file on disk and/or print hard copy.

The operator-friendly user interface is designed to lead the operator through the analysis process as simply as possible.

The report is designed to be accessible to non-technical readers and therefore a textual description of each file is provided for every GSM file.

In order to ensure that the terminal 3 operates correctly at all times it is checked as follows:
1. Before every acquisition, the terminal 3 performs a self-test to verify that the software stored in the terminal's flash memory has not been modified and that the real-time clock is valid.
2. Every four weeks the terminal 3 must be connected to a PC and fully checked using terminal calibration software.

The terminal calibration program runs on a PC that communicates with the terminal 3 using a standard serial interface. Once communications are established, the terminal calibration software verifies that the software in the terminal 3 is valid and performs a CRC checksum analysis. The program then validates the terminal's clock, and corrects the clock if necessary.

A terminal 3 which has not been calibrated within the necessary time cannot be used to acquire forensic data. However, when the calibration is due in a week or less, the terminal 3 will automatically remind the operator of the deadline before beginning acquisition.

It is envisaged that the analysis and terminal calibration programs that form part of the toolkit 1 can be used on a PC comprising the following example specification:
800 MHz Intel Pentium 3 (or equivalent)
128 Mb RAM
5 Mb free hard disk space (excluding space for saved reports)
Windows 2000 or Windows XP operating system
Standard 9 pin RS-232 serial port
USB port for Mouse Smartcard reader
USB port for software security tag The above specification is an example only and it is envisaged that any other suitable electronic data processing apparatus having any other suitable specification can alternatively be used.

The toolkit 1 described above supports the secure extraction and analysis of data from standard SMART cards currently in use in the UK. It is envisaged that the capabilities of the toolkit 1 will be equally applicable to mobile phone SIM cards and third generation USIM cards (3G cards). USIM cards have a number of differences from standard GSM SIM cards including larger storage capacity and a far more sophisticated phonebook.

In some cases it is difficult to perform machine interpretation of all of the data extracted from a target card 19. For example where records have been deleted or partially overwritten, they may still contain useful forensic data. Therefore the analysis program can also provide automatic and semi-automatic analysis to extract further data.

Where there has been operator assistance this will be clearly highlighted in the report to avoid any doubt about the validity of the result.

The security of data copied onto storage cards 15, 17, 18 is assured by using a combination of shared keys which only allow a storage card 15, 17, 18 to be written to when the correct sequence of events is followed.

The terminal 3 manages the acquisition process.

The control card 13 runs a bespoke software application and contains a database with the following information for each production batch (BATCHDATE) of storage cards 15, 17, 18:
A storage card access security key, SECURITYKEY1; and, A table containing 256 randomly generated keys, ENCRYPTIONKEY1 to ENCRYPTIONKEY256.

Each storage card 15, 17, 18 is a SMART card, pre-configured in the factory to have a number of distinct features:

It cannot be written to unless the correct 'personalisation' key (referred to as SECURITYKEY2) is presented;

SECURITYKEY2 is only accepted by each storage card 15, 17, 18 once and will be rejected if it is presented again; and SECURITYKEY2 puts each storage card 15, 17, 18 into a mode where files may be created and stored on the respected card 15, 17, 18.

At the time of production, a random value is selected for the SECURITYKEY2 of each storage card 15, 17, 18 and the following information is then pre-loaded onto each storage card 15, 17, 18:

The batch date of each storage card 15, 17, 18, BATCHDATE;

A random index value, KEYOFFSET, used to select an ENCRYPTIONKEY;

The mathematical result, termed ESECURITYKEY2, of applying a DES encryption algorithm to the SECURITYKEY2 value with the key ENCRYPTIONKEY<KEYOFFSET>.

The value for KEYOFFSET and ESECURITYKEY2 may only be read after a correct value for SECURITYKEY1 has been supplied to the control card 13 at the beginning of the process.

Figure 7:
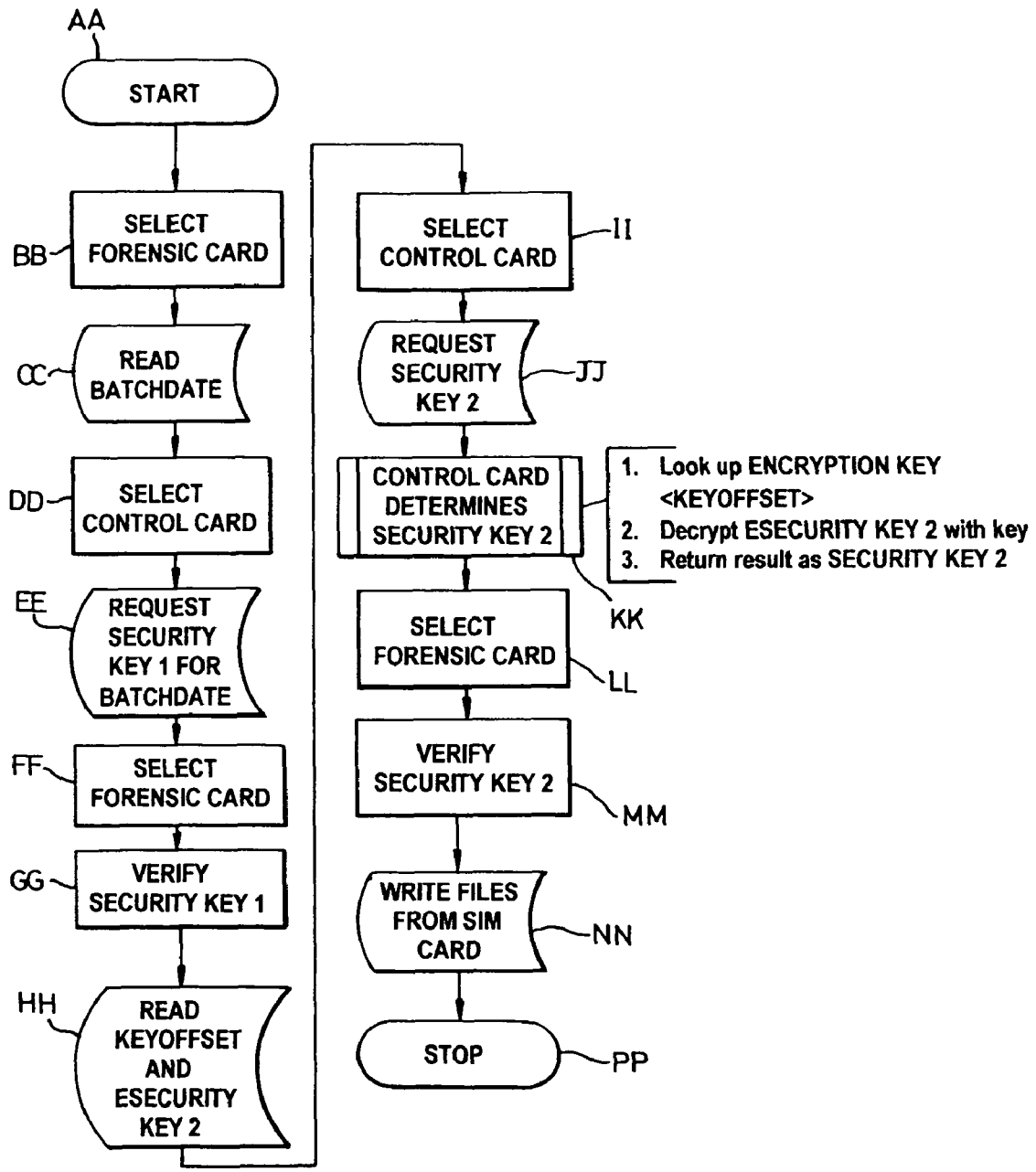
FIG. 7 is a flow diagram of a sub method of using the forensic toolkit of FIGS. 1 to 4.

A flowchart of the security authentication process is shown in FIG. 7 in steps AA to PP.

The terminal 3 initially selects the storage card 15, 17, 18 to which data is to be copied and reads the value(s) BATCHDATA.

The terminal 3 then selects the control card 13 and requests the user to input SECURITYKEY1 to the terminal 3 for the batch date determined.

The user inputted key is then verified against the SECURITYKEY1 stored on the particular storage card 15, 17, 18 concerned.

If the key is verified the control card 13 enables the terminal 3 to read the values for KEYOFFSET and ESECURITYKEY2 from the particular storage card 15, 17, 18 concerned.

These values are then input to the control card 13 and SECURITYKEY2 is requested from the control card 13.

The control card 13 comprises code generation means comprising a decryptor that determines SECURITYKEY2 by initially looking up the ENCYPTIONKEY that corresponds to the random value of KEYOFFSET on the ENCYRPTIONKEY database on control card 13. The corresponding encryption key is then used by the decryptor to enable the ESECURITYKEY2 to be decrypted to reveal SECURITYKEY2. The ENCYPTIONKEY thus enables the encrypted SECURITYKEY2 to be accessed.

Once accessed, the decrypted SECURITYKEY2 is verified against the value of SECURITYKEY2 stored on the particular storage card 15,17,18 concerned. If this verification is positive, copying of data from the target card 19 to the storage card 15, 17, 18 is enabled.

It is important to note that:

The plain-text value of SECURITYKEY2 is not stored anywhere but is set as a key in each storage card 15, 17, 18. SECURITYKEY2 cannot be read directly;

The value for SECURITYKEY2 is randomly selected for each storage card 15, 17, 18 and is not related to the serial number or production date of each storage card 15, 17, 18; and The control card 13 generates the SECURITYKEY2 from information held on each storage card 15, 17, 18.

The access storage card 18 allows forensic examination to be performed within legislative guidelines, while ensuring that all original data is retained in the mobile phone handset for retrieval.

The access storage card 18 is created using generally the same procedure as used with the other storage cards 15, 17 as described above. However a difference is that during the write process of data files from the target card 19 to the access storage card 18, certain files are changed to prevent the access storage card 18 from being used to access any electronic network such as, for example a mobile phone network. Two different methods are used. It is envisaged that either or both method could be used as desired.

In order to allow priority of users in a mobile phone network, the GSM/3G specifications require that each user is allocated one or more of fifteen 'Access Control Classes'. The access control class(es) is stored on the mobile phone SIM or USIM card, and before accessing the network, the mobile phone handset must check that the mobile phone network has the user's access control class enabled.

One method used to prevent network access is to not allocate any access control classes in the copy of the mobile phone SIM or USIM card made on the access storage card 18. When the access storage card 18 is inserted into a mobile phone handset and the handset is turned on, the copy of the SIM or USIM card is forced to believe that the copy of the SIM or USIM card is not allowed to access the mobile phone network.

Before a mobile phone handset can make or receive calls or make or receive text messages the handset must register with the mobile phone network and as part of the registration process, security checks are performed to verify that the mobile phone user is valid. The mobile phone network asks the SIM or USIM card (through the mobile phone handset) to confirm its identity using a secret value (Ki) and checks the SIM or USIM card's response against the expected value.

The access storage card 18 ensures that the authentication procedure will fail by not supporting the secret value Ki. This means that if a mobile phone handset incorrectly contacts a mobile phone network and attempts to register with the mobile phone network, the subsequent authentication procedure will fail.

A SMART card such as a SIM or USIM card can have a file system similar to that of a Windows PC, whereby one top-level directory consists of several sub-directories and/or files. Those sub-directories can also contain sub-directories and/or files and so on. Thus, a metaphorical tree is formed consisting of directories and files.

On a GSM SIM card or USIM card, the file system structure is mostly pre-set by the industry ETSI and 3GPP specifications. Therefore, any card conforming to those specifications should behave and react in the same way.

As the storage cards are copies of an original SIM or USIM card, which conform to the industry specifications, so storage cards also conform to the industry specifications, meaning that if a storage card was put into a mobile phone handset, the handset would recognise it as a normal SIM or USIM card and should behave normally.

However the storage cards are not intended for use with a mobile phone handset, and therefore the structure of the file system is altered to stop the mobile phone handset functioning in a normal way if a storage card were inserted into it.

Figure 8:
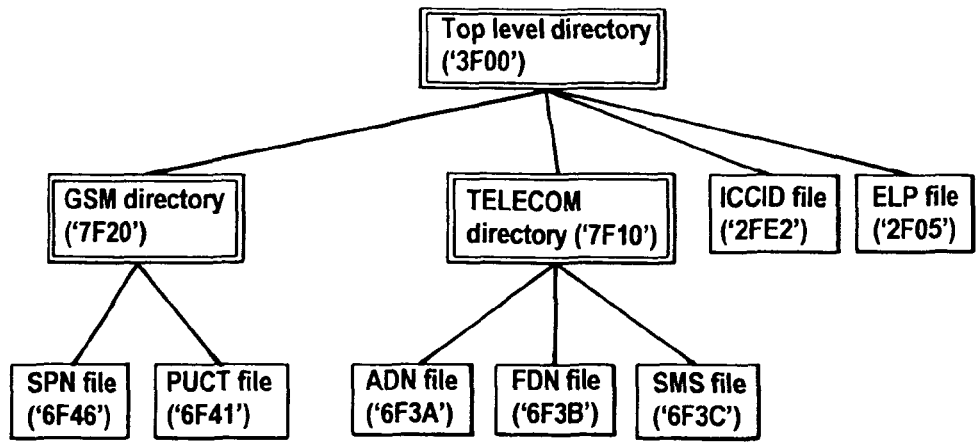
FIG. 8 is an example file structure of an electronic SMART card.

The file system structure in the ETSI and 3GPP specifications is (partially) defined as shown in FIG. 8 wherein each directory and file has an identifier such as, '7F20'. The names are purely to make the identifiers human readable.

When a copy of the SIM or USIM card is created on the storage card, most of the file system structure is created and copied to match the original SIM or USIM card. However, the GSM directory is logically renamed (from GSM to FORENSIC) and given a different identifier (from 7F20 to 7F15) and all files that exist in the original GSM directory are copied to the FORENSIC directory.

Figure 9:
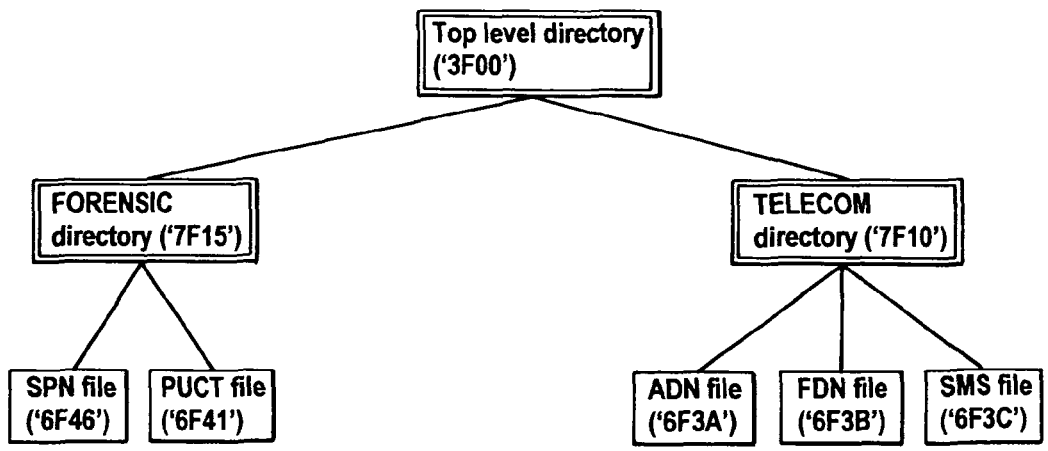
FIG. 9 is an example modified file structure of a copy of an electronic SMART card.

So the copy of the SIM or USIM card made on each storage card uses a file structure as shown in FIG. 9. By changing the file system structure in this way, if a storage card is inserted into a mobile phone handset, the mobile phone handset will not 'see' the files it requires to function correctly, although they will exist in another directory on the storage card.

Thus all of the files from the original SIM/USIM card are copied to each storage card, but those files are stored in a different logical layout. This means that if the storage card were entered into a mobile phone handset, the handset will not recognise it as a normal SIM/USIM card and will not therefore function correctly.

The above described tool kit 1 can be used with any type of electronic SMART card where potentially evidential data is stored or transferred, including mobile phone SIM or USIM cards, or SMART cards as used in commercial or passenger vehicles.

APPENDIX A

| Elementary File name | Description | CHV1 Required | Optional File |
|---|---|---|---|
| ELP | Extended Language Preference | | |
| LP | Language - Preference | | |
| PLMNSel | PLMN Selector | √ | √ |
| ACMMax | ACM Maximum value | √ | √ |
| ACM | Accumulated Call Meter | √ | √ |
| PUCT | Price per unit and currency table | √ | √ |
| CBMI | Cell broadcast Information Identifier Selection | √ | √ |
| BCCH | Broadcast Control Channels | √ | |
| FPLMN | Forbidden PLMNs | √ | |
| LOCI | Location Information | √ | |
| Aaem | Automatic Answer for eMLPP Service | √ | √ |
| CBMIR | Cell Broadcast message Identifier for Data Download | √ | √ |
| DCK | De-personalisation Control Keys | | |
| KcGPRS | GPRS Ciphering key KcGPRS | √ | |
| LOCIGPRS | GPRS location information | √ | |
| ADN | Abbreviated Dialling numbers | √ | √ |
| FDN | Fixed Dialling numbers | √ | √ |
| SMS | Short messages | √ | √ |
| CCP | Capability configuration parameters | √ | √ |
| MSISDN | Mobile Subscriber Identity Service Dialling Number | √ | √ |
| SMSP | Short Message Service Parameters | √ | √ |
| SMSS | SMS Status | √ | √ |
| LND | Last Number Dialled | √ | √ |
| SDN | Service Dialling Numbers | √ | √ |
| EXT1 | Extension 1 | √ | √ |
| EXT2 | Extension 2 | √ | √ |
| EXT3 | Extension 3 | √ | √ |
| BDN | Barred Dialling numbers | √ | √ |
| EXT4 | Extension 4 | √ | √ |
| SMSR | Short Message Service Reports | √ | √ |
| SST | SIM Service Table | √ | |
| ICCID | ICC Identification | | |
| IMSI | International Mobile Subscriber Identity | | |
| NIA | Networks Indication of Alerting | √ | √ |
| CNL | Co-operative Network List | √ | √ |
| DCK | Depersonalisation keys | √ | √ |
| ECC | Emergency Call Codes | | √ |
| CBMID | Cell Broadcast Message Identifier | √ | √ |

APPENDIX A-continued

| Elementary File name | Description | CHV1 Required | Optional File |
|---|---|---|---|
| | For Data Download | | |
| eMLPP | Enhanced Multi-Level Pre-emption and Priority | √ | √ |
| VBSS | Voice Broadcast Service Status | √ | √ |
| VBS | Voice Broadcast Service | √ | √ |
| VGCSS | Voice Group Call Service Status | √ | √ |
| VGCS | Voice Group Call Service | √ | √ |
| Phase | Phase Identification | | |
| AD | Administrative Data | | |
| ACC | Access Control Class | √ | |
| SPN | Service Provider Name | √ | |
| GID1 | Group Identifier Level 1 | √ | √ |
| GID2 | Group Identifier Level 2 | √ | √ |
| HPLMN | HPLMN Search Period | √ | |
| Kc | Ciphering Key | √ | |
| IMSI | International Mobile Station Identity | √ | |
| SAi | SoLSA Access Indicator | √ | √ |
| SLL | SoLSA list | √ | √ |
| LSA | Descriptor file | √ | √ |
| IMG | Image | √ | √ |
| IIDF | Image Instant Data Files | | |

The invention claimed is:

1. A forensic tool kit for accessing data stored on an electronic SMART card, the kit comprising a SMART card reader and recorder, at least one storage card, and a control card, the card reader and recorder being operative to read and copy the electronic SMART card onto the storage card, and to read the control card, the storage card comprising a storage card security key, the control card comprising code generation means operative to generate a control card security key, copying of the electronic SMART card onto the storage card being prevented unless the control card security key is verified against the storage card security key, wherein the control card comprises database means containing data relating to a plurality of storage cards, the data including data enabling the control card to distinguish between storage cards, wherein the database means further comprises a plurality of storage card access security keys, each storage card access security key being particular to a particular batch of storage cards, data exchange between the control card and the storage card being prevented, in use, until an access security key input to the control card by a user has been verified, and wherein the tool kit comprises more than one storage card, one of the storage cards comprising an access storage card for use with a mobile phone handset, the card reader and recorder being operative to alter the copy of the mobile phone SIM or USIM card made on the access storage card so that the copy is not allocated any access control classes, the arrangement being such that, when the copy of the mobile phone SIM or USIM card is activated in a mobile phone handset, the copy of the mobile phone SIM or USIM card is not allowed access to any of the mobile phone networks.

2. The tool kit of claim 1 wherein the control card is configured to generates the control card security key using data relating to one of the storage cards.

3. The tool kit of claim 1 wherein the database means contains data relating to a plurality of production batches of storage cards, the data including data enabling the control card to distinguish between batches.

4. The tool kit of claim 1 wherein the database means includes data comprising a plurality of randomly generated encryption keys, one of the encryption keys being used by the control card as part of the verification process between the control card and one of the storage cards.

5. The tool kit of claim 4 wherein the code generation means is operative to generate the control card security key for verification against a particular storage card using an encryption key particular to that storage card.

6. The tool kit of claim 5 wherein the particular encryption key used is selected by the control card using a random integer relating to the particular encryption key, the random integer being stored on the storage card.

7. The tool kit of claim 4 wherein the storage card also stores an encrypted security key.

8. The tool kit of claim 7 wherein the encrypted security key is pre calculated on manufacture of the storage card by inputting the random integer and the storage card security key into an encryption algorithm.

9. The tool kit of claim 5 wherein the code generation means is operative to generate the control card security key by decrypting the encrypted security key using the particular encryption key.

10. The tool kit of claim 1 wherein the code generation means comprises a decryptor.

11. The tool kit of claim 1 wherein the card reader and recorder is operative to alter the copy of the mobile phone SIM or USIM card such that when the copy of the mobile phone SIM or USIM card is activated in a mobile phone handset, the authentication procedure that normally occurs between a mobile phone SIM or USIM card and a mobile phone network is disrupted.

12. The tool kit of claim 11 wherein where the mobile phone network ordinarily authenticates the mobile phone SIM or USIM card by requesting a secret integer and verifying the requested secret integer against a prestored expected integer, the card reader and recorder prevents the secret integer being supported on the storage card.

13. The tool kit of claim 1 wherein at least one of the storage cards is operative to prevent verification of the correct control card security key more than once and thus is operative to prevent writing of files to the storage card more than once.

14. The tool kit of claim 1 wherein at least one of the storage cards comprises stored batch data, namely data indicative of the date the storage card was manufactured.

15. The tool kit of claim 1 wherein the file structure of the copy of the SMART card on each storage card comprises a different logical layout to the file structure of the target SMART card.

16. The tool kit of claim 1 wherein the card reader and recorder comprises slot means to receive at least two electronic SMART cards, and control means operative to control the operation of the SMART cards and to control the access of data from, and the communication between, the two SMART cards.

17. The tool kit of claim 1 wherein the card reader and recorder is a desktop terminal.

* * * * *